US008484447B2

(12) United States Patent
Chang

(10) Patent No.: US 8,484,447 B2
(45) Date of Patent: Jul. 9, 2013

(54) SELECTING A COMPATIBLE PROCESSOR TO CONTROL A PERIPHERAL COMPONENT INTERCONNECT EXPRESS (PCI-E) SLOT UNIT WITHIN A PREDETERMINED INTERVAL VIA A SETTING MENU

(75) Inventor: Yung-Po Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 310 days.

(21) Appl. No.: 12/890,695

(22) Filed: Sep. 26, 2010

(65) Prior Publication Data

US 2011/0296072 A1    Dec. 1, 2011

(30) Foreign Application Priority Data

May 31, 2010    (TW) .................................... 99117374

(51) Int. Cl.
*G06F 9/00*    (2006.01)
*H05K 7/10*    (2006.01)

(52) U.S. Cl.
USPC .................................... 713/1; 713/2; 710/301

(58) Field of Classification Search
USPC ......................................... 713/1, 2; 714/2, 12
See application file for complete search history.

(56) References Cited

U.S. PATENT DOCUMENTS

| 4,511,982 | A | * | 4/1985 | Kurakake ...................... 700/177 |
| 4,564,900 | A | * | 1/1986 | Smitt .............................. 709/212 |
| 4,631,661 | A | * | 12/1986 | Eibach et al. ..................... 714/10 |
| 5,450,576 | A | * | 9/1995 | Kennedy .......................... 713/2 |
| 5,675,772 | A | * | 10/1997 | Liu et al. ........................ 703/27 |
| 6,138,247 | A | * | 10/2000 | McKay et al. .................... 714/10 |
| 6,378,084 | B1 | * | 4/2002 | Strunk et al. ...................... 714/2 |
| 6,618,783 | B1 | * | 9/2003 | Hammersley ................. 710/305 |
| 6,950,893 | B2 | * | 9/2005 | Chan ............................ 710/240 |
| 7,480,831 | B2 | * | 1/2009 | McAfee et al. ................. 714/43 |
| 8,266,362 | B2 | * | 9/2012 | Bhesania et al. ............. 710/316 |
| 2001/0018721 | A1 | * | 8/2001 | McKenna et al. ............. 710/126 |
| 2006/0107112 | A1 | * | 5/2006 | Michaelis et al. .............. 714/15 |

* cited by examiner

*Primary Examiner* — Thomas Lee
*Assistant Examiner* — Phil Nguyen
(74) *Attorney, Agent, or Firm* — Altis Law Group, Inc.

(57) ABSTRACT

A method for controlling peripheral component interconnect express (PCI-E) slots of a computer reads processor configuration information of a PCI-E slot unit from a CMOS chip when the computer boots up, and controls a GPIO interface to output a first control signal to a PCI-E multiplexer according to the processor configuration information, to control a PCI-E slot unit of the computer to connect to one of processors of the computer through the PCI-E multiplexer according to the first control signal. Then the method checks whether the processor connected to the PCI-E slot unit is running normally. In addition, the method controls the GPIO interface to output a second control signal to the PCI-E multiplexer if the processor connected to the PCI-E slot unit is not running normally, to control the PCI-E slot unit to connect to another processor through the PCI-E multiplexer according to the second control signal.

12 Claims, 3 Drawing Sheets

SELECTING A COMPATIBLE PROCESSOR TO CONTROL A PERIPHERAL COMPONENT INTERCONNECT EXPRESS (PCI-E) SLOT UNIT WITHIN A PREDETERMINED INTERVAL VIA A SETTING MENU

BACKGROUND

1. Technical Field

Embodiments of the present disclosure relate generally to computers, and more particularly, to a system and method for controlling peripheral component interconnect express (PCI-E) slots of a computer.

2. Description of Related Art

Sandy bridge processors are a new generation of processors, which have a peripheral component interconnect express (PCI-E) controller to control components inserted on PCI-E slots of a computer. If more than two Sandy bridge processors are installed in the computer, only one PCI-E controller of the Sandy bridge processors may be used to control the components inserted on the PCI-E slots. When the Sandy bridge processor that is connected to the PCI-E slots is not installed or damaged, the components inserted on the PCI-E slots cannot work.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
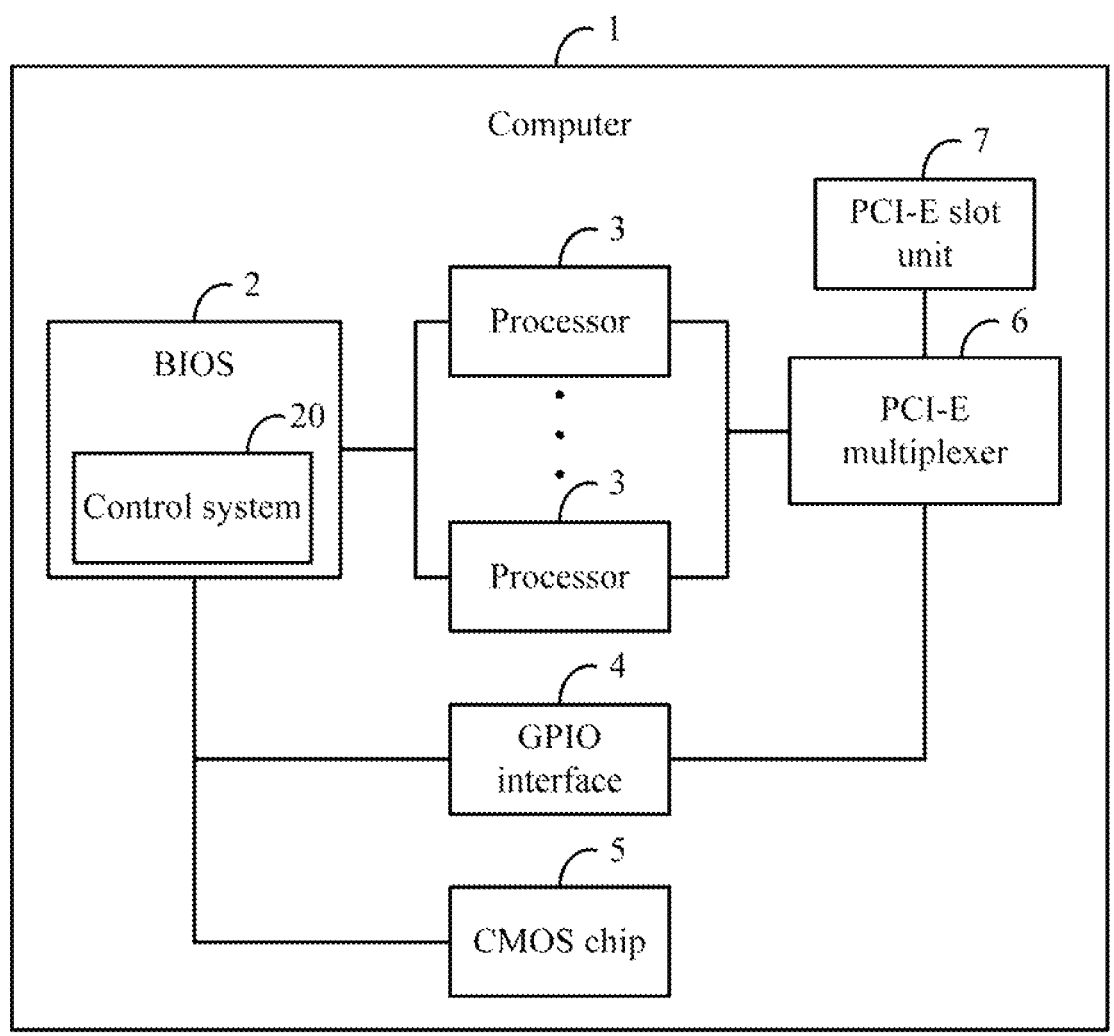
FIG. 1 is a block diagram of one embodiment of a computer.

FIG. 1 is a block diagram of one embodiment of a computer 1. In the embodiment, the computer 1 includes a basic input output system (BIOS) 2, a general purpose input output (GPIO) interface 4, a complementary metal oxide semiconductor (CMOS) chip 5, a peripheral component interconnect express (PCI-E) multiplexer 6, a PCI-E slot unit 7, and a plurality of processors 3. The PCI-E slot unit 7 includes a plurality of PCI-E slots. The BIOS 2 includes a control system 20 for controlling the PCI-E slot unit 7 to connect to one of the processors 3, so that components inserted on the PCI-E slots can be controlled by one of the processors 3. In one embodiment, each of the processors 3 may be a Sandy bridge-based processor. It should be apparent that FIG. 1 is only one example of the computer 1 that can be included with more or fewer components than shown in other embodiments, or a different configuration of the various components.

In one embodiment, each of the processors 3 may connect to the PCI-E slot unit 7 through the PCI-E multiplexer 6. The control system 20 controls the GPIO interface 4 to output a control signal to the PCI-E multiplexer 6 according to processor configuration information of the PCI-E slot unit 7 stored in the CMOS chip 5, so that the PCI-E multiplexer 6 can control the PCI-E slot unit 7 to connect to one of the processors 3 according to the control signal. The processor configuration information may be preset by a user and stored in the CMOS chip 5. For example, the processor configuration information may denote that the PCI-E slot unit 7 is controlled by the processor 3 installed in a first processor socket of the computer 1.

Figure 2:
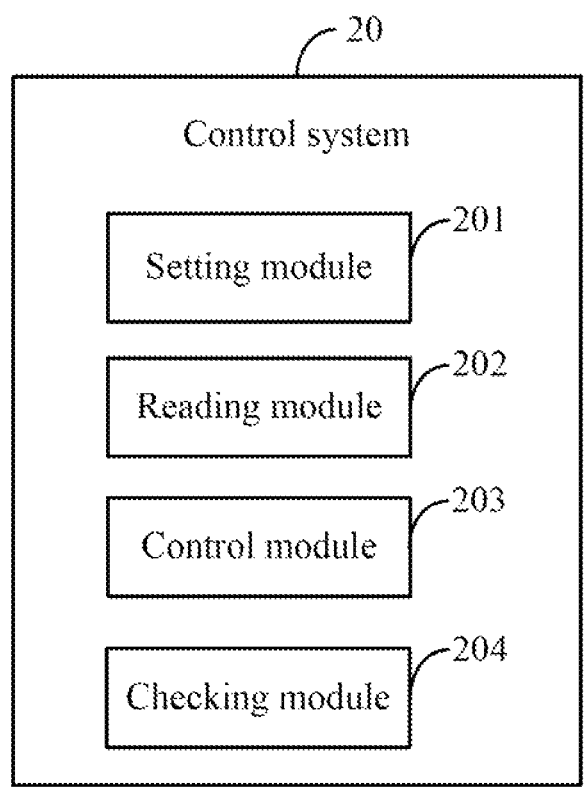
FIG. 2 is a block diagram of one embodiment of functional modules of a control system of FIG. 1.

FIG. 2 is a block diagram of one embodiment of functional modules of the control system 20 of FIG. 1. The control system 20 may include a plurality of functional modules comprising one or more computerized instructions that are integrated in the BIOS 2 and are implemented when the computer 1 boots up. In one embodiment, the control system 20 includes a setting module 201, a reading module 202, a control module 203, and a checking module 204. In general, the word "module," as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The setting module 201 is operable to set one of the processors 3 to control the PCI-E slot unit 7, and store the setting as the processor configuration information of the PCI-E slot unit 7 in the CMOS chip 5. In one embodiment, the computer 1 provides a setting menu to the user for setting the processor configuration information when the computer 1 boots up. The user can log into the setting menu in a predetermined interval, such as 5 seconds, for example. If the user does not log into the setting menu in the predetermined interval, the computer 1 continues to implement a booting program, such as a power-on self-test (POST) program. For example, the user may set the processor 3 installed in a second socket of the computer 1 to control the PCI-E slot unit 7. If the processor configuration information is not set by the user, the processor configuration information may be default processor configuration information. For example, the default processor configuration information may denote that the PCI-E slot unit 7 is controlled by the processor 3 installed in the first processor socket of the computer 1.

The reading module 202 reads the processor configuration information of the PCI-E slot unit 7 from the CMOS chip 5 when the computer 1 boots up.

The control module 203 controls the GPIO interface 4 to output a first control signal to the PCI-E multiplexer 6 according to the processor configuration information read from the CMOS chip 5, and controls the PCI-E slot unit 7 to connect to one of the processors 3 through the PCI-E multiplexer 6 according to the first control signal. For example, if the processor configuration information denotes that the PCI-E slot unit 7 is controlled by the processor 3 installed in the first processor socket of the computer 1, the control module 203 may control the GPIO interface 4 to output a digital signal "00", and the PCI-E multiplexer 6 controls the PCI-E slot unit 7 to connect to the processor 3 installed in the first processor socket according the digital signal "00". If the processor configuration information denotes that the PCI-E slot unit 7 is controlled by the processor 3 installed in the second processor socket of the computer 1, the control module 203 may control the GPIO interface 4 to output a digital signal "01", and the PCI-E multiplexer 6 controls the PCI-E slot unit 7 to connect to the processor 3 installed in the second processor socket according the digital signal "01".

The checking module 204 checks whether the processor 3 connected to the PCI-E slot unit 7 is running normally. In some embodiments, if the processor 3 is not running normally, the processor 3 may be damaged or not installed properly. The checking module 3 may check whether the processor 3 connected to the PCI-E slot unit 7 is running normally using the POST program of the computer 1.

The control module 203 controls the GPIO interface 4 to output a second control signal to the PCI-E multiplexer 6 upon the condition that the processor 3 connected to the PCI-E slot unit 7 is not running normally, and controls the PCI-E slot unit 7 to connect to another processor 3 through the PCI-E multiplexer 6 according to the second control signal. For example, if the checking module 204 determines that the processor 3 installed in the first processor socket is connected to the PCI-E slot unit 7 and does not run normally, but the processor 3 installed in the second processor socket is running normally. The control module 203 may control the GPIO interface 4 to output the second control signal "01" to the PCI-E multiplexer 6, and the PCI-E multiplexer 6 controls the processor 3 installed in the second processor socket to connect to the PCI-E slot unit 7 according the second control signal "01".

Figure 3:
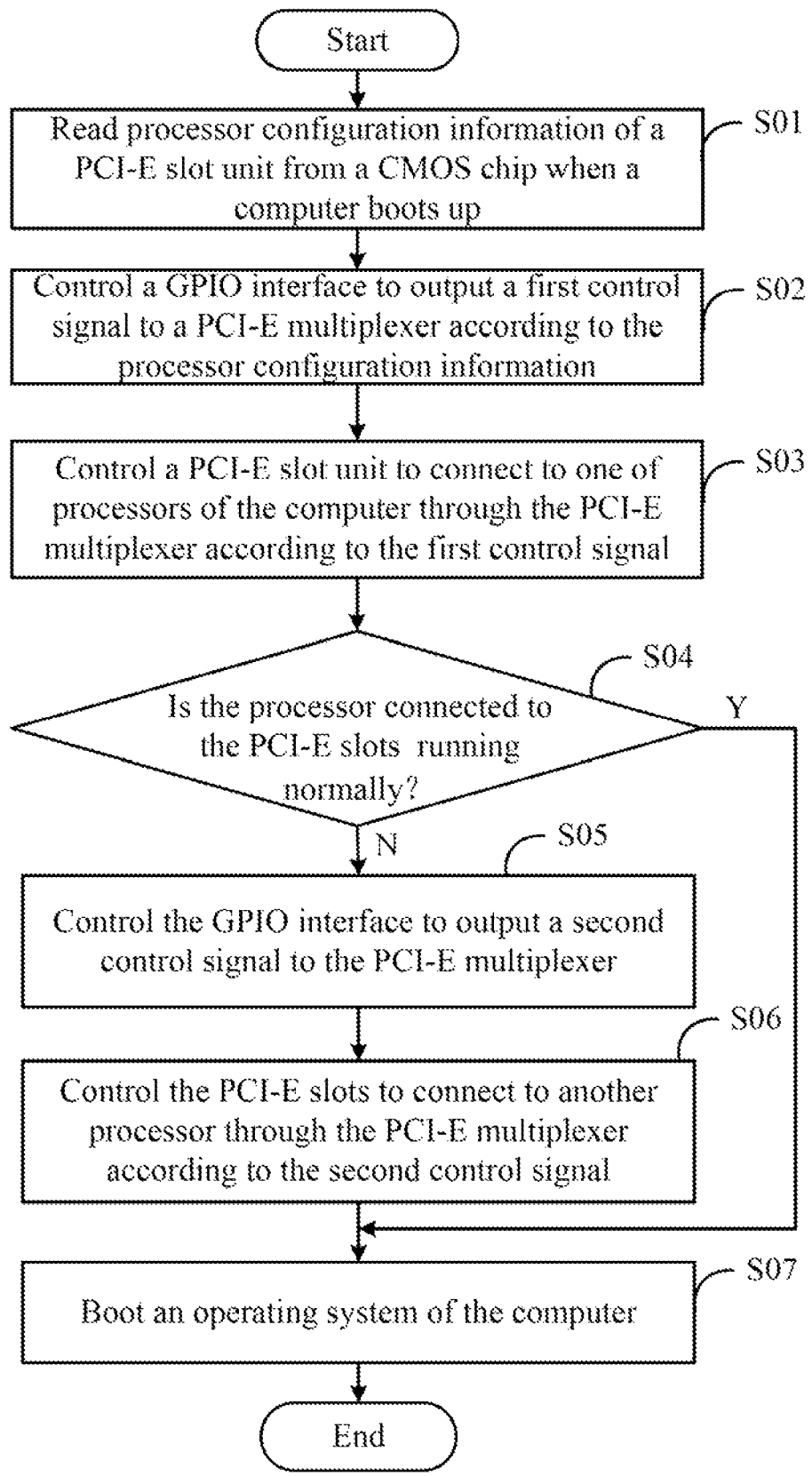
FIG. 3 is a flowchart of one embodiment of a method for controlling PCI-E slots of the computer of FIG. 1.

FIG. 3 is a flowchart of one embodiment of a method for controlling PCI-E slots of the computer of FIG. 1. Depending on the embodiment, additional blocks may be added, others removed, and the ordering of the blocks, may be changed.

In block S01, the reading module 202 reads processor configuration information of the PCI-E slot unit 7 from the CMOS chip 5 when the computer 1 boots up. As described above, the processor configuration information may be preset and stored in the CMOS chip 5 through the setting module 201.

In block S02, the control module 203 controls the GPIO interface 4 to output a first control signal to the PCI-E multiplexer 6 according to the processor configuration information read from the CMOS chip 5. For example, if the read processor configuration information denotes that the PCI-E slot unit 7 is controlled by the processor 3 installed in the first processor socket of the computer 1, the control module 203 controls the GPIO interface 4 to output a digital signal "00". If the read processor configuration information denotes that the PCI-E slot unit 7 is controlled by the processor 3 installed in the second processor socket of the computer 1, the control module 203 controls the GPIO interface 4 to output a digital signal "01".

In block S03, the PCI-E multiplexer 6 controls the PCI-E slot unit 7 to connect to one of the processors 3 according to the first control signal. For example, if the first control signal is the digital signal "00", the PCI-E multiplexer 6 controls the PCI-E slot unit 7 to connect to the processor 3 installed in the first processor socket. If the first control signal is the digital signal "01", the PCI-E multiplexer 6 controls the PCI-E slot unit 7 to connect to the processor 3 installed in the second processor socket.

In block S04, the checking module 204 checks whether the processor 3 connected to the PCI-E slot unit 7 is running normally. If the processor 3 connected to the PCI-E slot unit 7 is running normally, block S07 is implemented. Otherwise, if the processor 3 connected to the PCI-E slot unit 7 is not running normally, block S05 is implemented.

In block S05, the control module 203 controls the GPIO interface 4 to output a second control signal to the PCI-E multiplexer 6. In one embodiment, if the checking module 204 determines that the processor 3 installed in the first processor socket is connected to the PCI-E slot unit 7 and does not run normally, but the processor 3 installed in the second processor socket is running normally. The control module 203 may control the GPIO interface 4 to output the second control signal "01" to the PCI-E multiplexer 6.

In block S06, the PCI-E multiplexer 6 controls the PCI-E slot unit 7 to connect to another processor 3 according to the second control signal. In one embodiment, if the second control signal is the digital signal "01", the PCI-E multiplexer 6 controls the PCI-E slot unit 7 to connect to the processor 3 installed in the second socket of the computer 1.

In block S07, the computer 1 boots an operating system when the PCI-E slot unit 7 connects to one of the processors 3.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling peripheral component interconnect express (PCI-E) slots of a computer, the computer comprising a plurality of processors, a PCI-E slot unit, and a PCI-E multiplexer, the method comprising:

reading processor configuration information of the PCI-E slot unit from a complementary metal oxide semiconductor (CMOS) chip of the computer when the computer boots up;

controlling a general purpose input output (GPIO) interface of the computer to output a first control signal to the PCI-E multiplexer according to the processor configuration information;

controlling the PCI-E slot unit to connect to one of the processors through the PCI-E multiplexer according to the first control signal;

checking whether the processor connected to the PCI-E slot unit is running normally;

booting an operating system of the computer, if the processor connected to the PCI-E slot unit is running normally; or controlling the GPIO interface to output a second control signal to the PCI-E multiplexer, if the processor connected to the PCI-E slot unit is not running normally;

controlling the PCI-E slot unit to connect to another processor through the PCI-E multiplexer according to the second control signal; and booting the operating system of the computer;

wherein the computer provides a setting menu to a user to set one of the processors to control the PCI-E slot unit when the computer boots up, and continues to implement a booting program of the computer in a predetermined interval when the user does not log into the setting menu to set one of the processors to control the PCI-E slot unit.

2. The method according to claim 1, further comprising:
setting one of the processors to control the PCI-E slot unit; and
storing the setting as the processor configuration information of the PCI-E slot unit in the CMOS chip.

3. The method according to claim 1, wherein the PCI-E slot unit comprises one or more PCI-E slots.

4. The method according to claim 1, wherein the processors are sandy bridge processors.

5. A system for controlling peripheral component interconnect express (PCI-E) slots of a computer, the computer comprising a plurality of processors, a PCI-E slot unit, and a PCI-E multiplexer, the system comprising:

a reading module operable to read processor configuration information of the PCI-E slot unit from a CMOS chip of the computer when the computer boots up;

a control module operable to control a general purpose input output (GPIO) interface of the computer to output a first control signal to the PCI-E multiplexer according to the processor configuration information, and control the PCI-E slot unit to connect to one of the processors through the PCI-E multiplexer according to the first control signal;

a checking module operable to check whether the processor connected to the PCI-E slot unit is running normally; and the control module further operable to control the GPIO interface to output a second control signal to the PCI-E multiplexer upon the condition that the processor connected to the PCI-E slot unit is not running normally, and control the PCI-E slot unit to connect to another processor through the PCI-E multiplexer according to the second control signal;

wherein the computer provides a setting menu to a user to set one of the processors to control the PCI-E slot unit when the computer boots up, and continues to implement a booting program of the computer in a predetermined interval when the user does not log into the setting menu to set one of the processors to control the PCI-E slot unit.

6. The computer according to claim 5, further comprising:
a setting module operable to set one of the processors to control the PCI-E slot unit, and store the setting as the processor configuration information of the PCI-E slot unit in the CMOS chip.

7. The computer according to claim 5, wherein the PCI-E slot unit comprises one or more PCI-E slots.

8. The computer according to claim 5, wherein the processors are sandy bridge processors.

9. A non-transitory storage medium storing a set of instructions, the set of instructions capable of being executed to perform a method for controlling peripheral component interconnect express (PCI-E) slots of a computer, the computer comprising a plurality of processors, a PCI-E slot unit, and a PCI-E multiplexer, the method comprising:

reading processor configuration information of the PCI-E slot unit from a complementary metal oxide semiconductor (CMOS) chip of the computer when the computer boots up;

controlling a general purpose input output (GPIO) interface of the computer to output a first control signal to the PCI-E multiplexer according to the processor configuration information;

controlling the PCI-E slot unit to connect to one of the processors through the PCI-E multiplexer according to the first control signal;

checking whether the processor connected to the PCI-E slot unit is running normally;

booting an operating system of the computer, if the processor connected to the PCI-E slot unit is running normally;

controlling the GPIO interface to output a second control signal to the PCI-E multiplexer, if the processor connected to the PCI-E slot unit is not running normally;

controlling the PCI-E slot unit to connect to another processor through the PCI-E multiplexer according to the second control signal; and booting the operating system of the computer;

wherein the computer provides a setting menu to a user to set one of the processors to control the PCI-E slot unit when the computer boots up, and continues to implement a booting program of the computer in a predetermined interval when the user does not log into the setting menu to set one of the processors to control the PCI-E slot unit.

10. The storage medium as claimed in claim 9, wherein the method further comprises:
setting one of the processors to control the PCI-E slot unit; and
storing the setting as the processor configuration information of the PCI-E slot unit in the CMOS chip.

11. The storage medium as claimed in claim 9, wherein the PCI-E slot unit comprises one or more PCI-E slots.

12. The storage medium as claimed in claim 9, wherein the processors are sandy bridge processors.

* * * * *